United States Patent [19]

Fischer

[11] Patent Number: 4,630,983
[45] Date of Patent: Dec. 23, 1986

[54] EXPANSION PIN

[76] Inventor: Artur Fischer, Weinhalde 34, 7244 Waldachtal 3/Tumlingen, Fed. Rep. of Germany

[21] Appl. No.: 679,020

[22] Filed: Dec. 6, 1984

[30] Foreign Application Priority Data

Dec. 15, 1983 [DE] Fed. Rep. of Germany ....... 3345331
Feb. 8, 1984 [DE] Fed. Rep. of Germany ....... 3404306

[51] Int. Cl.$^4$ ............................................. F16B 21/08
[52] U.S. Cl. .......................................... 411/15; 411/35; 411/112; 411/447; 411/508; 411/512
[58] Field of Search ................... 411/15, 18, 21, 35, 411/37, 512, 107, 111, 112, 446, 447, 448, 449, 450, 508; 339/252 P

[56] References Cited

U.S. PATENT DOCUMENTS

| 2,271,495 | 1/1942 | Hall | 411/512 X |
| 3,080,787 | 3/1963 | Bertelsmann | 411/15 |
| 3,315,558 | 4/1967 | Fischer | 411/15 |

FOREIGN PATENT DOCUMENTS

| 1087655 | 8/1960 | Fed. Rep. of Germany ... 339/252 P |
| 624378 | 4/1927 | France | 339/252 P |
| 828535 | 2/1938 | France | 339/252 P |
| 857018 | 4/1940 | France | 339/252 P |
| 1431842 | 2/1966 | France | 339/252 P |
| 220574 | 2/1943 | Switzerland | 339/252 P |

Primary Examiner—Gary L. Smith
Assistant Examiner—Adrian H. Whitcomb, Jr.
Attorney, Agent, or Firm—Michael J. Striker

[57] ABSTRACT

The disclosure relates to an expansion pin consisting of a shank which at one end is provided with means for securing articles and at the other end is provided with a point. In order to obtain an anchoring having further expansion effect, the shank has an aperture in the form of a slot in which there is inserted a plastically and/or resiliently deformable insert which thickens the shank of the expansion pin in the region of the slot.

11 Claims, 6 Drawing Figures

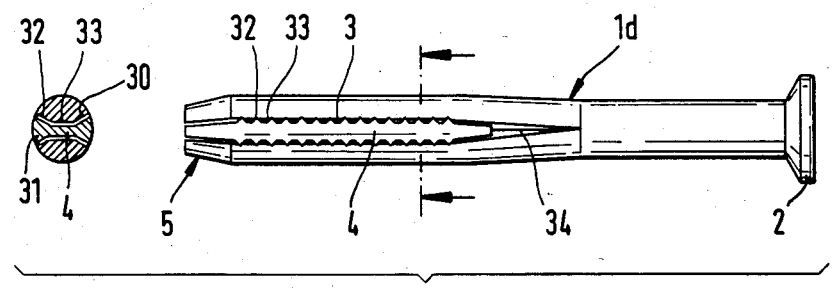
FIG. 5
FIG. 6
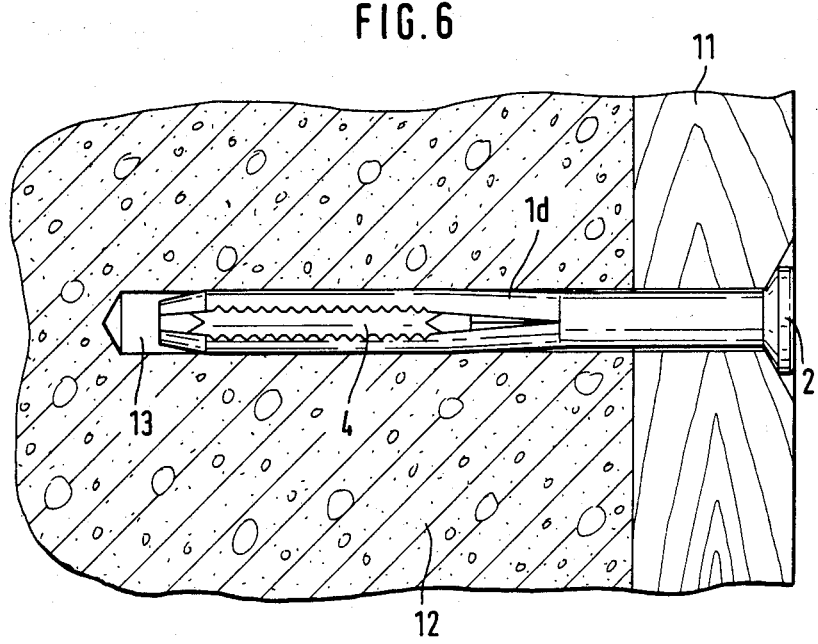

EXPANSION PIN

BACKGROUND OF THE INVENTION

The invention relates to an expansion pin comprising a shank which at one end is provided with means for securing articles and at the other end is provided with a point and which can be expanded by means of an expansion element that engages in an apertured region.

A known expansion pin is anchored as follows: by hammering the expansion pin into a predrilled hole an expansion element seated at the base of the drilled hole penetrates the aperture in the expansion pin. As a result, the limbs of the expansion pin are wedged open and pressed against the wall of the drilled hole. This type of anchoring requires a blind bore of a depth that must be exactly adhered to and that matches that of the expansion pin. Since the expansion element has an expander cone that tapers in the direction of pull, with this anchoring principle there is a risk that, even in the case of low loads, the expansion pin will be pulled away from the expansion element and the wedging action will thus be nullified. In addition, such an expansion pin has no capacity for further expansion, which likewise will result in the failure of the anchoring should the drilled hole become wider as a result of crack formation.

SUMMARY OF THE INVENTION

It is an object of the invention to provide an expansion pin that is simple to produce and to mount and that is capable of further expansion should the drilled hole become wider.

Pursuant to this object one aspect of the invention resides in the aperture being in the form of a slot in which there is inserted a plastically and/or resiliently deformable insert which enlarges the shank of the expansion pin in the region of the slot.

As a result of the insert enlarging the shank of the expansion pin, the shank has greater dimensions than the predrilled hole. When the expansion pin is driven into the drilled hole, as a result of the pressure acting on the expanding limbs the insert is compressed to such an extent that the expansion pin can be driven into the drilled hole by strong hammer blows. As a result of the plastic and/or resilient deformability of the insert, tolerances in the drilled hole are compensated for. After the pin has been driven in, the expanding limbs of the expansion pin are pressed against the wall of the drilled hole as a result of the plastic and/or resilient restoring force of the insert and consequently the anchoring necessary to secure an article is obtained. As a result of this restoring force the clamping action is retained even if the drilled hole should become wider through the formation of cracks. Since the base of the drilled hole is not involved in the expansion, the expansion pin is also suitable for through bores and for bores of unlimited depth.

In a further embodiment of the invention the slot can be provided with tapering end regions and the insert can be matched to the shape of the slot. Using this design produces an adaptable external shape that is favourable for driving in the expansion pin.

In yet another embodiment of the invention the insert can be made of plastic and can have an elliptical cross-section transverse to the longitudinal direction. As a result of the elliptical shape of the insert, if the expanding limbs of the expansion pin are supported centrally, free spaces are produced in the peripheral region of the slot, which spaces can receive the material of the insert that is displaced when the expansion pin is driven in.

In yet a further embodiment of the invention the insert can be provided at least over a part of its length with guide ribs that rest against the outer surface of the pin. These guide ribs serve to retain and hold the insert in the slot.

In still another embodiment of the invention the insert can consist of spring sheet metal and can be of corrugated construction. Particularly in the case of expansion pins of relatively large diameter, sheet steel inserts of corrugated construction are advantageous because of their very high resilience of shape.

In a further embodiment of the invention the slot can have a V-shaped longitudinal notch on each side and the insert can have on each of its two longitudinal sides a portion of enlarged cross-section matched to the longitudinal notches.

As a result of the V-shaped longitudinal notches, the cross-section of the slot is enlarged, which enables the entire volume of the insert serving for anchoring to be enlarged without there being any significant weakening of the expanding limbs. The portion of the insert that is of enlarged cross-section and is matched to the longitudinal notches, on the one hand enlarges the total effective pressing surface and, on the other hand, results in more advantageous radial pressure distribution. Since the two longitudinal sides of the insert likewise come into contact with the wall of the drilled hole, as a result of the deformation of the insert occurring when the expansion pin is driven in, a wedging action that grips the whole outer face of the expansion pin is obtained in the drilled hole. This results in very high holding values without at the same time increasing resistance to driving in.

In a further embodiment of the invention the insert can be made of plastic and can have on its lower and upper sides rib-like projections transverse to its longitudinal direction. As a result of the rib-like projections the compression pressure necessary for deforming the insert and therefore the resistance to driving in are reduced to such an extent that driving in the expansion pin presents no problems even in narrow drilled holes. The relatively high degree of deformation of the insert resulting from the projections permits better compensation for the tolerances in the drilled holes while the holding values vary only slightly.

Finally, in a further embodiment of the invention transverse grooves can be arranged in the surfaces of the limbs defining the slot. The width of the insert can be slightly larger than that of the drilled hole so that the longitudinal sides of the insert are also involved in anchoring in the compression in the drilled hole. This measure can, however, have the result that when the expansion pin is driven into the drilled hole the insert is displaced in the direction towards the base of the slot so that crushing and damaging of the insert occurs. As a result of the transverse grooves arranged in the surfaces of the limbs, into which grooves the material of the insert or the rib-like projections is or are pressed, the insert is held firmly in the slot of the expansion pin. Displacement therefore no longer takes place.

In another embodiment of the invention the V-shaped longitudinal notches are extended beyond the end of the slot in the direction towards the head of the expansion pin by means of a funnelled portion. This funnelled portion has the effect that there is no abrupt transition from the part of the expansion pin shank weakened by the slot to the unapertured part of the shank. The enlargement of the transition region distributes the stress peak which occurs at this point when the expansion pin is driven in and which could possibility result in the expanding limbs buckling in the case of extreme mounting conditions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5, shows an alternate embodiment of the expansion pin with an insert; and

FIG. 6, shows the securing of an article with the expansion pin according to FIG. 5.

DETAILED DESCRIPTION OF THE PREFERRED EMBODIMENTS

Figure 1:
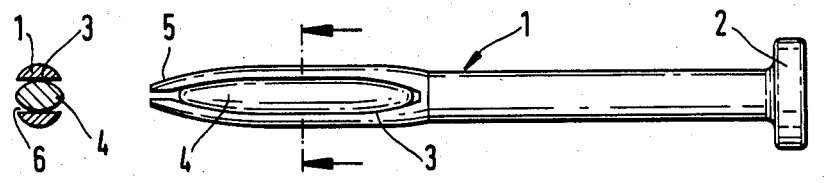
FIG. 1, shows the expansion pin with an insert according to the invention.

FIG. 1 shows an expansion pin 1 which is provided with a shank and a pin head 2 for clamping an article to a piece of masonry. The expanding region of the expansion pin is formed by a slot 3 which defines limbs. In the slot 3 there is inserted an insert 4 which is preferably made of plastic. The expanding region has an external shape that corresponds approximately to the shape of the slot, which tapers in its two end regions, and the shape of the insert 4, which is matched to the shape of the slot. As a result, together with a point 5 provided on the expansion pin 1 there is produced an external shape that is favourable for driving the expansion pin into a drilled hole. Transverse to the longitudinal direction the insert 4 has an elliptical cross-section so that free spaces 6 are produced for receiving the material of the insert 4 that is displaced after driving in.

Figure 2:
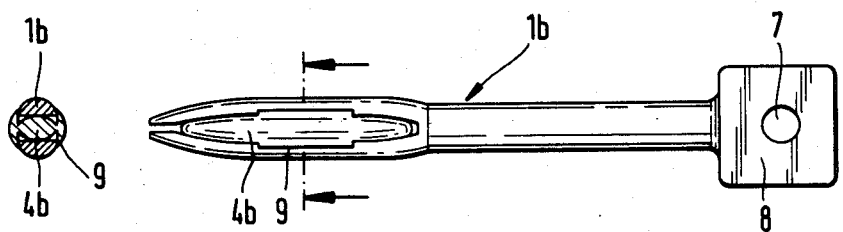
FIG. 2, shows an expansion pin constructed in the form of a hanging device having an insert retained in the slot.

The expansion pin 1b according to FIG. 2 has a plate 8 provided with a bore 7 for hanging a wire, for example for suspending pipes, ceilings and the like. For the purposes of holding and retaining, the insert 4b is provided with laterally arranged guide ribs 9 which rest against the outer surface of the expansion pin 1b.

Figure 3:
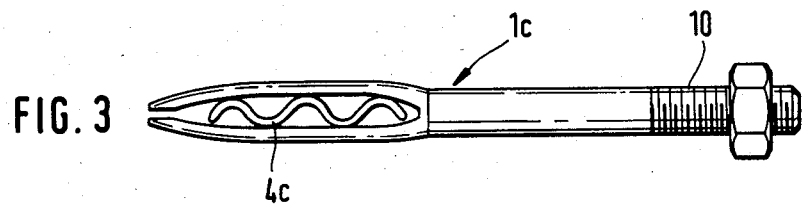
FIG. 3, shows an expansion pin having a threaded connection and a spring sheet metal insert.

As seen in FIG. 3, the expansion pin 1c is provided with a threaded connection 10, the insert 4c is formed by spring sheet metal that is bent to form corrugations. When the pin is driven in, the spring sheet metal is stretched. As a result of the high resilience of shape there is produced a very strong compression pressure which wedges the limbs of the expansion pin 1c against the wall of the drilled hole.

Figure 4:
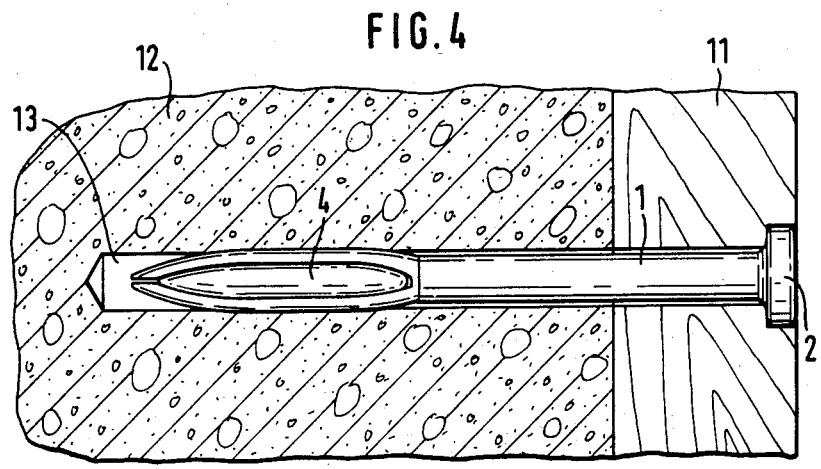
FIG. 4, shows the securing of an article using an expansion pin.

In order to secure a wooden lath 11 to a piece of masonry 12 according to FIG. 4, a hole 13, corresponding to the diameter of the shank of the expansion pin, is drilled through the wooden lath and into the masonry. The expansion pin 1 is driven into the drilled hole by hammer blows on the pin head 2 until the pin head 2 is flush with the lath 11. As a result of the deformation of the insert 4 and of the restoring force resulting therefrom, the anchoring necessary to secure the lath 11 is obtained.

The expansion pin 1d according to FIG. 5 has on each of the two longitudinal sides of its slot 3 a V-shaped longitudinal notch 30 which is filled by a portion 31 of the insert 4 that is of enlarged cross-section and is matched to the longitudinal notch. In order, on the one hand, to improve the deformation behaviour of the insert and, on the other hand, to reduce the compression pressure, the lower and upper sides of the insert 4 have rib-like projections 32 which are supported against the surfaces of the limbs defining the slot.

In order to avoid displacement of the insert 4 when the expansion pin 1d is hammered into a narrow drilled hole, transverse grooves 33 are provided in the surfaces of the limbs defining the slot 3. The spacing of the transverse grooves 33 is matched to the spacing of the rib-like projections 32 of the insert 4 so that the tips of the rib-like projections 32 are received in these transverse grooves 33. There is thus produced a positively-locking connection which prevents axial displacement of the insert. The V-shaped longitudinal notches 30 of the slot 3 are continued in the direction towards the head 2 of the expansion pin by means of a tapering funnelled portion 34. As a result, an abrupt reduction in the cross-section from the solid shank of the expansion pin to the expanding limbs is avoided.

FIG. 6 shows the securing of a wooden lath 11 to a piece of masonry 12 using the expansion pin 1d, the pin head 2 being hammered in until it is flush with the outer surface of the lath.

While the invention has been illustrated and described as embodied in an expansion pin, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansion pin for securing articles to a support structure, comprising:
   a shank having an apertured region, two ends, an outer surface, and an expandable portion at one end;
   means for securing the articles by the expansion pin at said other end of said shank; and
   a deformable expansion element oriented in said apertured region so as to thicken said shank, said expansion element having a length and having guide ribs at least over a part of said length that rest against said outer surface of said shank.

2. An expansion pin as defined in claim 1, wherein said apertured region has an aperture in the form of a slot.

3. An expansion pin as defined in claim 1, wherein said expansion element is a plastically deformable insert.

4. An expansion pin as defined in claim 1, wherein said expansion element is resiliently deformable insert.

5. An expansion pin as defined in claim 2, wherein said slot is provided with tapering end regions, and the expansion element is matched to the shape of the slot.

6. An expansion pin as defined in claim 1, wherein said expansion element is made of plastic and has an elliptical cross-section.

7. An expansion pin as defined in claim 4, wherein said insert is made of spring sheet metal having a corrugated construction.

8. An expansion pin for securing articles to a support structure, comprising:
   a shank having an apertured region, two ends, and an expandable portion at one end;
   means for securing the articles by the expansion pin at said other end; and
   a deformable expansion element having two longitudinal sides and oriented in said apertured region so as to thicken said shank,
   said apertured region having an aperture formed as a slot having a V-shaped longitudinal enlargement at each side, and a portion of each of said longitudinal sides of said expansion element being of enlarged cross-section matched to said longitudinal enlargements.

9. An expansion pin as defined in claim 1, wherein said expansion element is elongated, has an upper and a lower side, and is provided on said upper side and said lower side with a plurality of rib-like projections transverse to the longitudinal direction of said expansion element.

10. An expansion pin as defined in claim 2, wherein said slot is defined by limbs having an inner surface arranged with a plurality of transverse grooves.

11. An expansion pin as defined in claim 8 wherein said two V-shaped longitudinal enlargements are extended beyond the end of said slot in the direction towards said securing means by means of a funneled portion.

* * * * *